United States Patent

[11] 3,630,254

| [72] | Inventor | Ludwig Stadelmann<br>Schopperstrasse 14, Altdorf, Nuremberg, Germany |
|---|---|---|
| [21] | Appl. No. | 877,692 |
| [22] | Filed | Nov. 18, 1969 |
| [45] | Patented | Dec. 28, 1971 |
| [32] | Priority | Nov. 30, 1968 |
| [33] | | Germany |
| [31] | | P 18 09 842.5 |

[54] DUAL-PURPOSE TIRE FOR DRY OR ICY ROADS
5 Claims, 2 Drawing Figs.

| [52] | U.S. Cl. | 152/209, 152/339 |
|---|---|---|
| [51] | Int. Cl. | B60c 11/00 |
| [50] | Field of Search | 152/209, 331, 339 |

[56] References Cited
UNITED STATES PATENTS

| 2,217,122 | 10/1940 | Lowry | 152/339 |
| 3,161,219 | 12/1964 | Danli | 152/339 |

FOREIGN PATENTS

| 590,622 | 12/1933 | Germany | 152/209 |

Primary Examiner—James B. Marbert
Attorney—Wolf, Greenfield & Sacks

ABSTRACT: The invention concerns a dual-purpose tire which can be used on both dry and snow-covered or icy roads, being made up of a monobloc casing comprising, in addition to its main tube, a second, smaller tube having a tread with points, these two tubes being inflated separately, so that the tread with points can by selection by brought level with or set back from the tread of the main tube.

PATENTED DEC 28 1971 3,630,254

INVENTOR
Ludwig Stadelmann
by Wolf, Greenfield, Hieken + Sacks

DUAL-PURPOSE TIRE FOR DRY OR ICY ROADS

The invention relates to a tire for motor vehicles, arranged so that it adapts to dry roads or icy roads, as required, i.e., able to adapt to the road conditions in all weathers, due to the fact that it comprises, in addition to the normal tread, a supplementary tube comprising a special tread which can be brought into use in winter by inflating with a compressed fluid, particularly air.

Modern motor vehicles attain high speeds on relatively well-made roads. In periods when there is no snow or ice, tires with a special profile, called summer tires, are used. By reason of their profile, these tires can endure high speeds and hold the road well. In addition, the treads of these tires, being less pronounced than those of snow tires, make less noise while the vehicle is in motion.

On the other hand, with the approach of winter, when snow and ice inevitably occur, it is inadvisable, even dangerous, to drive on a road, the surface of which has now changed, with the above-mentioned type of tires. That is why road users change tires at the onset of this season, to use winter tires which have a particularly sculptured profile and hold the road better on snow and ice.

Winter tires comprising steel spikes sunk into the rubber and projecting one millimeter beyond the tread profile, allow the vehicle to hold the road even better. Tires of this type ensure a high level of security and have proved their worth. The asymmetrical positioning of the spikes seems to add other advantages.

To face the state of the roads in winter, it is thus necessary to change tires. Unfortunately, it is not possible to foresee the date when the winter period and the changed state of the roads will begin. During this season, winter appears without previous notice; it snows and freezes, although many motorists have not yet taken their precautions.

In their professional activity, many people are dependent upon their car. Not all are able to change tires when ice suddenly appears. For want of time and special knowledge of the subject, more than one person is obliged to consult a garage. The time needed to adapt the vehicle to the changed state of the road causes not only holdups, but obliges the user to drive for miles on a dangerous road surface.

Very prudent motorists fit their spiked tires when the state of the road is still good. Unfortunately this deteriorates the road surface. Moreover, these same motorists place themselves in danger, since it has been proved that winter tires increase considerably the braking distance and time when the road is dry or wet.

It is well known that a system of fixing treads called "interchangeable treads" on the tires has been contemplated. However, this substitution process has never been put into practice, due to the fact that it has proved impossible to guarantee the efficiency of the fixing of detachable treads. Moreover, the "replacement" requires special know-how on the part of the driver.

Several years ago a project was also introduced for fixing nonskid devices on tires; these devices had to be fixed laterally on the tire in the form of tabs. If the tire flattens or skids, these tabs or beaded zones slip between the tires and the road, in this way preventing a further skid. Decades have passed since this invention was introduced, and during this time the situation between vehicle and road has changed completely. Given the present density of traffic with its continuously changing dangers, any start of a skid constitutes a great danger. As a result, everything possible must be done to prevent this situation from continuing. The aforementioned invention does not constitute an all-weather tire.

It was then proposed to make spikes jut out telescopically from the tread of the tire. This solution presents many drawbacks, because dust or grains of sand enter between the spikes and the rubber and erode the tire. Moreover, this solution cannot check the start of a skid because the spikes only become active whilst the tire is being flattened.

Other solutions have been proposed, all of which presented the same drawbacks and thus have not been put into use.

This invention aims especially at remedying the above-mentioned drawbacks. It proposes a tire so conceived that in summer it serves as an ordinary tire and in winter as a snow and ice tire, without necessitating any transformation or modification of its form.

To this end, the invention concerns a dual-purpose tire for motor vehicles, which adapts, as required, to dry or to icy roads, having the profile of a summer tire, characterized by the fact that it comprises at least one supplementary compartment, nonsymmetrical to the main compartment with which it forms a single piece, the exterior profile of this supplementary compartment forming the tread of a snow and ice tire and comprising gripping means, notably spikes, the two compartments being inflatable separately.

In conformity with the invention, the normal profile of the tire is only very slightly narrowed. That is why a second, smaller compartment is adapted onto it, in a single piece; this second compartment receives a flexible inner tube. It is inflated separately with compressed air. The tread of this second compartment comprises spikes incorporated according to a known procedure.

The two compartments can therefore be inflated separately with compressed air.

The main compartment is inflated to the normal pressure, i.e. to 1.9 atm. for a rear wheel; it thereby constitutes the running tire and its profile corresponds to that of a summer tire.

If the need to make use of the second, spiked compartment is not felt, it would be as well to reduce its pressure to about 1.3 atm. In this way the second compartment will be withdrawn in relation to the tread of the first compartment, and so not engaged. Variations in the pressure of the main compartment are taken into consideration; as long as the normal maximum load of the vehicle is not exceeded these variations will not entail the intervention of the second, spiked compartment. The spikes will act effectively only in the case of an important flattening, such as that occurring during a skid, and then they will establish the control of the vehicle, even in summer conditions.

In the case of ice and snow, the second, incorporated compartment is inflated to a higher pressure, so as to bring the spikes level with the tread of the main compartment, or even make them extend beyond it.

The advantages afforded by this invention lie in particular in the fact that summer and winter tires are replaced by a single type of dual-purpose tire; hence economy for the driver. Moreover, the laborious task of changing tires in winter and in summer is done away with. Another advantage lies in the face that in each service station, or with a single pump, the tire can immediately be transformed into a winter tire if the need arises.

A method of producing the invention is shown as a nonlimiting example in the attached drawings in which.

Figure 1:
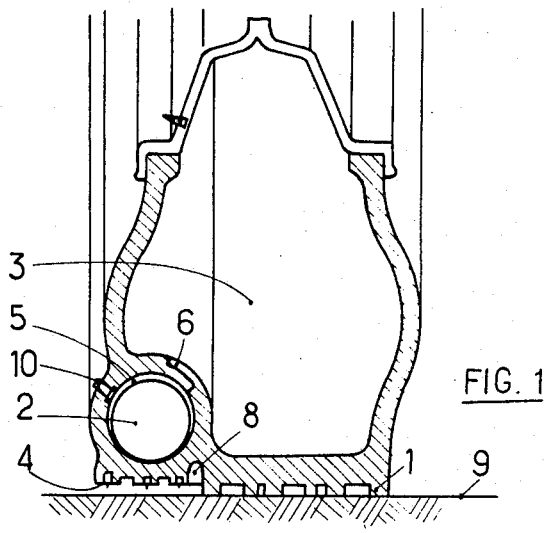
FIG. 1 shows a section of a tire in which the main compartment is in contact with the road surface, whilst the second, incorporated compartment is withdrawn.

The tire shown in FIG. 1 is made up of a well-known flexible, reinforced material and its surface 1 presents the usual profile. The normal width of the tire is either reduced or increased by means of a supplementary compartment 2, linked to the main compartment 3 and forming a single piece with it. The spikes are fixed according to a known method in the exterior face of the supplementary compartment 2.

A supple inner tube 5 is inflated with compressed air. The beads 6 determine the size of the compartment 2 and a groove 7 separates the tread of the main compartment 3 from that of the supplementary compartment 2.

FIG. 1 shows the tire as a summer tire without the intervention of tube 2. The supplementary compartment 2 is provided with a special device 10 for inflation.

Figure 2:
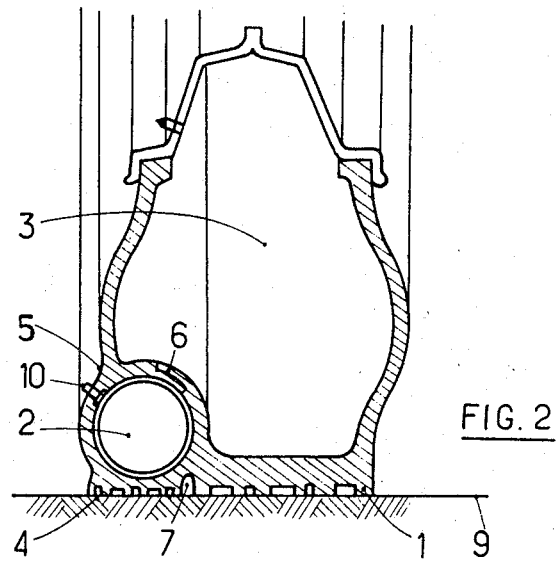
FIG. 2 shows a section of a tire in which both the main compartment and the second compartment are in contact with the road surface.

FIG. 2 shows the supplementary compartment 2 in use, and thus in contact with the road surface 9.

Of course, the invention is not limited to the production examples described and presented above; from these it is possible to foresee other methods and other forms of production, which in no way exceed the compass of the invention.

What is claimed is:

1. A dual-purpose tire adapted for selective use on both dry and icy roads comprising:

a unitary tire casing formed to define a main compartment and a supplementary compartment, said supplementary compartment being non symmetrical to said main compartment;

the external periphery of said main compartment being formed to define a tread adapted for use under dry road conditions;

the exterior periphery of said supplementary compartment being formed to define a tread of different configuration adapted for use under icy road conditions;

means enabling said supplementary compartment to be inflated separately from said main compartment;

said casing being constructed as to enable the radial location of said supplementary tread to be controlled as a function of the degree of inflation of said supplementary compartment to locate said supplementary tread between an inoperative position in which it is disposed radially inwardly of said main tread and an operative position in which said supplementary tread is disposed at the same radial level with the main tread.

2. A dual-purpose tire as defined in claim 1 further comprising:

said supplementary tread including a plurality of spikes circumferentially spaced thereabout and extending radially therefrom.

3. A dual-purpose tire as defined in claim 2 further comprising:

said casing including an expandable wall portion for separating said main and supplementary compartments; and a flexible, expandable inner tube disposed within said supplementary compartment.

4. A dual-purpose tire as defined in claim 1 further comprising:

said casing having an expandable wall portion separating said main and supplementary compartments; and a flexible, expandable inner tube exposed within said supplementary compartment.

5. A dual-purpose tire as defined in claim 1 further comprising:

said tire including a groove formed between said main and supplementary compartments and adapted to be interrupted by liaison tabs.

* * * * *